United States Patent [19]
Baker et al.

[11] 3,935,029
[45] Jan. 27, 1976

[54] METHOD OF FABRICATING A CARBON - POLYTETRAFLUOROETHYLENE ELECTRODE - SUPPORT

[75] Inventors: Bernard Baker, Brookfield Center; Martin Klein, Brookfield, both of Conn.

[73] Assignee: Energy Research Corporation, Danbury, Conn.

[22] Filed: Feb. 19, 1974

[21] Appl. No.: 443,209

Related U.S. Application Data

[63] Continuation of Ser. No. 200,052, Nov. 18, 1971.

[52] U.S. Cl. ............ 136/121; 136/122; 136/120 FC
[51] Int. Cl. ............................................ H01m 13/04
[58] Field of Search ... 136/122, 121, 120 FC, 86 D; 264/105, 127

[56] References Cited
UNITED STATES PATENTS 3,385,736  5/1968  Deibert............................ 136/121 X
3,407,096  10/1968  Landi................................ 136/121 X
3,531,329  9/1970  Selwitz............................ 136/120 FC
3,634,569  1/1972  Emanuelson et al. ............. 264/105

*Primary Examiner*—Anthony Skapars
*Attorney, Agent, or Firm*—Watson Leavenworth Kelton & Taggart

[57] ABSTRACT

An electrode substrate is described which is suitable for supporting noble metal electrodes in fuel cells and similar electrochemical cells. It is composed of fine graphite particles enmeshed in a web of fibers of polytetrafluoroethylene (PTFE) produced by forming a homogeneous mixture of graphite particles and PTFE powder in an organic liquid, removing the liquid, and milling the mixture in a series of steps to form a thin, porous, electrically conductive sheet of graphite-PTFE which is an excellent support for thin film metallic electrodes and which is resistant to corrosive electrolytes.

3 Claims, 3 Drawing Figures

METHOD OF FABRICATING A CARBON - POLYTETRAFLUOROETHYLENE ELECTRODE - SUPPORT

This is a continuation of application Ser. No. 200,052, filed Nov. 18, 1971.

This invention relates to an electrode substrate which forms a support for an electrode in an electrochemical cell. More particularly it relates to porous sheet material composed of graphite particles enmeshed in a web of fibers of polytetrafluoroethylene, and to a method of producing such material. This invention specifically deals with the construction of an electrode substrate or electrode support of a low cost chemically inert material.

BACKGROUND OF THE INVENTION

In the construction of electrochemical fuel cells it is desirable to use low cost construction components, whenever possible. This is not always a simple thing to achieve because in many instances, especially in acid-electrolyte fuel cells, the electrolyte is extremely corrosive and thereby attacks many common construction materials.

An electrochemical fuel cell is a device for converting chemical energy of a fuel directly into electrical energy by means of a galvanic process. The components of a fuel cell consist of an electrolyte which conducts ions between two electrodes, a positive or reducing electrode, and a negative or oxidizing electrode.

The negative electrode is sometimes referred to as the fuel electrode and the positive electrode is most commonly an oxygen or air electrode. The electrodes are brought in intimate contact with the electrolyte where galvanic reactions take place when the external circuit is closed. It is next necessary to be able to remove and transfer electrons to and from the electrodes by means of appropriate conductors. Simultaneously it is necessary to be able to supply fuel and oxygen to the electrode to provide a continuous source of the active material. Therefore, in addition to the electrodes themselves, there must be provided access to the active site via the fuel and oxidizing gas compartments in the cell.

In many types of fuel cells, the electrodes are supported by metallic grids. The metallic grids, in addition to being mechanical supports, act as electronic current conductors as well as providing porous structures through which gas can readily pass. In the case of acid fuel cells, which are an important embodiment of the present invention, the choice of electronic conductors to be used as metallic grids in the electrode assemblies is severely limited by the corrosive nature of the acids. Only a very few metallic materials are capable of withstanding the corrosive action of concentrated sulfuric and phosphoric acids commonly used in fuel cells. Typical metals which can provide the above function are platinum, tantalum, and sometimes niobium if the temperatures are not too high.

Metal alloys which might be compatible with the acid are generally poor materials for use in fuel cells because of severe oxidizing and reducing conditions that exist at the electrode during the fuel cell operation.

We have discovered that graphitic materials are ideally suited to withstand the corrosive nature of phosphoric and sulfuric acids over the entire range of acid concentration and operating temperatures commonly used in fuel cells. This application is directed to solving the problem of how to produce the graphitic materials in an appropriate form to provide the additional functions of gas accessibility and current collection as well as mechanical electrode support.

The four main requirements for an electrode substrate in the fuel cell are good electrical conductivity, good gas diffusion characteristics, resistance to the electrolyte from a corrosion viewpoint, and good thermal conductivity. The latter characteristic is almost invariably met when the higher priority electrical conductivity criterion is met.

BRIEF SUMMARY OF THE INVENTION

This application describes how to fabricate porous graphitic electrode support materials, which exhibit equal or superior properties to commonly used metallic grid materials but greatly reduce the cost, thereby increasing the feasibility of commercially available electrochemical fuel cells.

It is therefore an object of this invention to provide a porous graphitic electrode substrate material suitable for use as an electrode support in electrochemical cells.

It is a further object of this invention to provide an electrode support material which allows reacting gas accessibility to the active fuel cell catalyst at sufficient rates to maintain meaningful operational conditions in electrochemical fuel cells.

It is still a further object of this invention to provide an electrode support which has sufficient electronic conductivity to be able to remove the current produced at the fuel cell electrodes without suffering high IR losses, commonly called voltage drops, by virtue of ohmic effects in the electrodes themselves.

Another object is to provide an electrode support for electrochemical cells having good thermal conductivity.

These and other objects of this invention will become clear in the description that follows, taken in conjunction with the drawings wherein:

FIG. 1 is a schematic sectional view of a conventional bipolar stack fuel cell;

FIG. 2 is a schematic representation of the electrode substrate and electrodes; and FIG. 3 is an enlarged schematic of the graphite-PTFE electrode-electrode substrate structure.

27, 1973 and entitled A METHOD OF MAKING A FUEL CELL ELECTRODE BY COMPRESSING A LEACHED MASS. It is generally about 0.5 to 3 mil in thickness.

Figure 3:
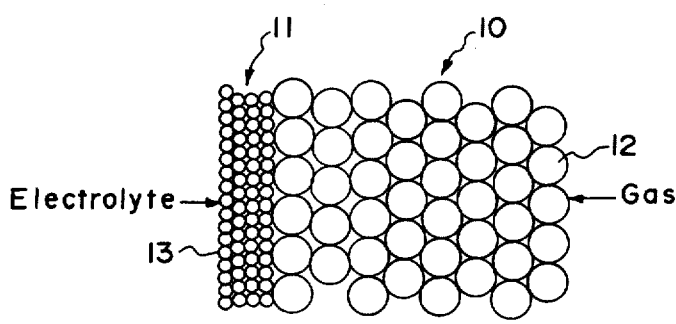

FIG. 3 illustrates the electrode structure in more detail. The substrate 10 is illustrated as made up of graphite particles 12 held together in a web or matrix of PTFE fibers or elongated particles. Since the PTFE forms usually only a small fraction of the substrate 10 it does not coat or cover the graphite particles 12 and the latter are in good electrical connection with each other, thus providing good electrical conductivity. The electrode 11 is illustrated as composed of metal (e.g. platinum black) particles 13 held in a web or matrix of PTFE, the latter comprising 15 to 35 weight percent of the electrode 11. It is seen that there are pores of interstices between the graphite particles 12 in the substrate 10 through which gas may pass, such as oxygen, air or hydrogen. In the substrate of this application the mean pore size is 10 microns and ranges from 6 to 12 microns. There are similar, though smaller, pores or interstices between the metal particles 13 in the electrode 11 into which the electrolyte may partially penetrate.

Figure 1:
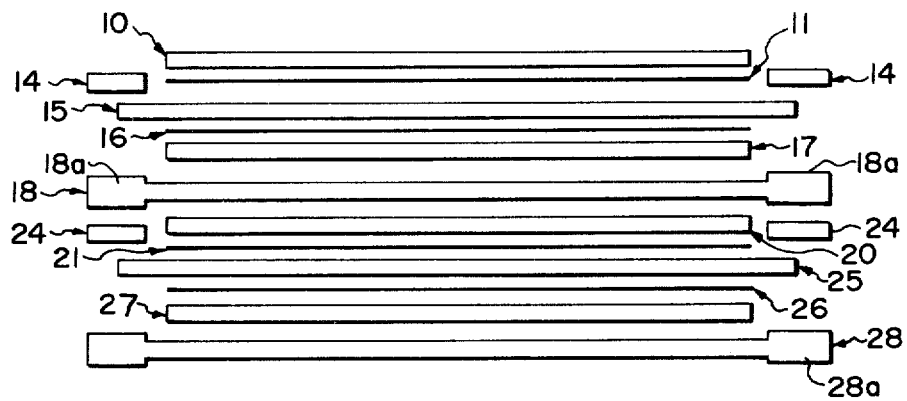

FIG. 1 is a schematic view of a complete fuel cell embodying the graphite-PTFE substrate of this application. In FIG. 1, 10 represents the porous graphite-PTFE substrate, about 10 mils in thickness, and 11 is the thin film platinum-PTFE anode, about 1.5 mils in thickness. A gasket 14 of inert resin such as a fluoroelastomer like "Viton" or PTFE, about 30 mils in thickness, seals the cell. The electrolyte matrix 15 is about 20 mils in thickness, of porous acid resistant material in which is absorbed an electrolyte such as sulphuric or phosphoric acid. The other side of the electrolyte matrix 15 is in contact with a thin film cathode 16 on a porous graphite-PTFE substrate or support 17. The structures of the cathode 16 and support 17 are substantially the same as those of the anode 11 and the substrate 10, respectively, although the specific catalysts in anode 11 and cathode 16 may be quite different. Adjacent and in contact with the cathode support 17 is a conductive bipolar plate 18, about 100 mils in thickness, which contains gas manifolds (now shown) which provide access of an oxidizing gas (e.g., air or oxygen) to the cathode 16 through the porous support 17. The bipolar plate 18 is electrically conductive and serves to transmit current from one cell to the adjacent one. The outer edges 18a of the plate 18 may be thicker than the main body and serve as supports for the gaskets 14. The structure, production and composition of this bipolar plate are described in our copending application entitled BIPOLAR FUEL CELL PLATE originally filed on November 18, 1971 as Ser. No. 200,022, now continuation application Serial No. 399,620, filed on September 21, 1973.

As shown in FIG. 1, the elements 10, 11, 14, 15, 16, 17 and 18 form a complete fuel cell. By the same token, the elements 20, 21, 24, 25, 26, 27 and 28 form another complete cell in series with the first fuel cell. The elements 20, 21, 24, 25, 26, 27, 28 and 28a are the same as 10, 11, 14, 15, 16, 17, 18 and 18a. Additional fuel cells can be stacked on each other in series as illustrated in FIG. 1 to provide a unit with the desired voltage.

In the operation of a fuel cell as shown in FIG. 1, the electrolyte matrix 15 and 25 is filled with an aqueous acid such as sulphuric or phosphoric. The fuel, hydrogen gas, is flowed through the porous anode support 10 to the platinum anode 11 via gas manifolds. The oxidant air or oxygen gas, is flowed through the gas manifolds in the bipolar plate 18 and through the porous cathode support 16 to the platinum cathode 16. The fuel is oxidized at the anode 11 and the oxidant is reduced at the cathode 16, causing ions to flow between the cathode and anode, thus producing an electric current which can be conducted out of the cell via the conductive support 10 and the conductive bipolar plate 18. A stack of cells in series operates in the same manner.

Figure 2:
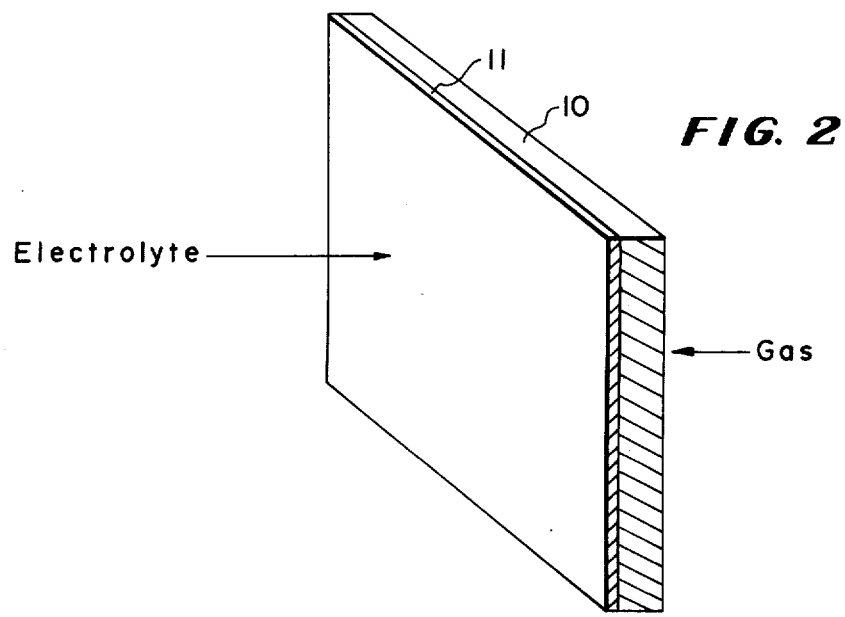
As shown in FIG. 2, the electrode structure is made up of a substrate 10 of graphite and PTFE and a thin metal-PTFE catalyst layer 11 supported thereon. The substrate 10 is generally about 10 mils in thickness, although the thickness usually may vary from 5 to 15 mils. Greater thickness may be used but may cause either diffusion or polarization losses. Lesser thickness may be acceptable in certain applications, although in-plane resistance may increase. The relative quantities of PTFE, where sintered and employed with a thermosetting resin, in the substrate can vary from as low as about 1% by weight to as much as 10% by weight, the balance being graphite. The metal in the catalyst layer 11 is preferably platinum black for cathodes, although other metals such as palladium, or other precious metal blacks or combinations thereof can be used. The metal-PTFE catalyst layer 11 is deposited on the substrate 10 by the procedure described in our copending application entitled FUEL CELL ELECTRODE originally filed on Nov. 18, 1971 as Ser. No. 200,222, now continuation application Ser. No. 428,826, filed on Dec.

In FIG. 1 the position of the graphite-PTFE electrode substrate 10 relative to the electrode 11 and bipolar plate in the fuel cell construction is shown. In FIG. 2 the detailed relationship between the electrode substrate 10 and the electrode 11 is shown and, therefore, electrolyte and gas movements to and from the electrode are shown. In consideration of FIG. 2 it is obvious that the electrode substrate should be thin as possible without sacrificing mechanical integrity and should be as porous as possible without sacrificing good electrical conductivity, with the exception that if the substrate is very thin then the gas passages in the bipolar plate must also be thin to avoid excessive inplane resistive losses. The pure graphite materials themselves have electrical conductivity several orders of magnitude higher than are required to make a good electrode substrate. However, conventional graphitic structures are extremely brittle and have porosities that are relatively low. Further, the pore size distribution of conventional graphitic material is extremely small, in the sub-micron range, resulting in a high tortuosity gas passage thus producing a barrier to gas diffusion resulting in concentration polarization in the fuel cell. In our invention we have circumvented these difficulties in fabricating electrode substrate materials by a judicious choice of graphite particles. If the graphite particles are used in manufacturing of the substrate are extremely fine, the substrate itself will contain a very narrow and small pore size distribution which causes the aforementioned concentration polarization phenomenon. Large particles of carbon in the substrate, on the other hand, will produce an irregular surface upon which to deposit the electrode, resulting in poor electrical conductivity, loss of active area, and pore contact with the electrolyte matrix. It is, therefore, necessary to use carbon particles in the appropriate size range of between about −100 and +200 mesh.

A further requirement is that as much graphite as possible be incorporated in the electrode substrate. Moreover, graphite per se is not in itself sufficient to make up the entire electrode substrate assembly since some agent is required to bond or hold the graphite particles together. Like the graphite this agent must be capable of withstanding the corrosive nature of the electrolyte used in the electrochemical cell. But, unlike the graphite, it is not necessary that this material possess the requisite of electrical conductivity properties, provided that the material can be used in relatively small amounts. In our invention we have developed a method of bonding the graphite particles of the substrate together using very small amounts of polytetrafluoroethylene (PTFE) powder. Electrode substrates have been made with as little as 6% by weight and as high as 32% by weight of PTFE, although the latter figure results in resistiveties that are too high.

In Table 1 are tabulated the electrical conductivities of a variety of substrate materials made up with a variety of graphitic materials. We have found that it is not only desirable to have single graphitic particles in the electrode substrate but it is sometimes advantageous to use several different types of graphite materials in the substrate itself to enhance the strength and electrical conductivity of the substrate.

TABLE 1

CONDUCTIVITY OF POROUS GRAPHITE SUPPORTS
Graphite Particle Size, microns

| Wt. % PTFE | 44 | 74–120 | 121–244 |
|---|---|---|---|
| | | Resistivity ohm-cm. | |
| 6 | 0.2 | 0.3 | 0.35 |
| 8 | .25 | .5 | 1.1 |
| 16 | .4 | 1.0 | 3.5 |
| 24 | .6 | 1.6 | 6.0 |
| 32 | .8 | 2.1 | — |

The following examples illustrate different processes by which the electrode substrates are manufactured. In general, the construction of the electrode substrate consists of several steps.

In the first step, the desired graphitic materials are mixed with the desired amount of PTFE in a blender in mineral spirits or other suitable organic liquid such as Stoddard solvent or other hydrocarbon or halogenated hydrocarbon liquid. After blending for a short period of time the materials are filtered, preferably on a Buchner or centrifugal filter, and the filter cake is then placed between rollers or between a roller and a flat surface and the material is worked between the rollers until a bonding consistency is set up between the particles of the substrate, mainly through the particles of PTFE stretching and forming interlocking fibers. At this point, the material is rolled into a flat sheet of the electrode substrate of the desired thicknesses and the substrate is allowed to dry to remove the organic liquid. Then, the substrate is ready to be used as the electrode support in an electrochemical cell. In some instances, it may be desirable to sinter the PTFE bonding agent in the substrate although this is not always required and depends on the particular electrochemical cell system in question.

Substrates made in accordance with this invention have been operated in fuel cells and their fuel cell performance compared with that of similar fuel cells operating with conventional grid structures. These results are summarized in Table 2. It can be readily seen there is no appreciable difference in operating performance between those cells employing metallic grids for the support of the electrode and those employing the electrode substrate described in this application. This fact is extremely important because a tremendous saving has been made in substituting the inexpensive graphitic material for the rather expensive metal grids.

It is possible that other types of electrode substrates can be used in place of particulate carbon. It is not uncommon for fibrous carbon filaments to be made into an electrode substrate. However, the results obtained with this type of electrode are generally inferior to those obtained with the electrodes described herein. For the first part this is because the fibrous carbon electrode substrate has a very irregular surface which cannot readily support low loadings of precious metal catalyst. In other words, a greater amount of precious metal catalysts is required on such substrates. Second, the graphite-PTFE substrate is made by a process which is considerably less expensive than the process for making graphite fibers. So again, a very positive gross advantage is realized in using the substrate as described in this invention and in the following examples.

EXAMPLE 1

A mixture of high purity graphite particles of a −100 +200 mesh screen size were mixed with polytetrafluoroethylene powder so that the weight of the PTFE was 7.5 percent of the mixture. The materials were blended in mineral spirits for approximately 3 minutes in a high-speed blender. The blended mixture was next filtered through a centrifugal filter and the homogenous carbon-PTFE mixture was then rolled to a thickness of 10 mils in a series of 10 milling operations which worked the graphite-PTFE mixture to a consistency such that it stuck to itself and could support its own weight. The 10-mil sheet, so rolled, was then air dried until the mineral spirits evaporated and the resultant substrate was ready for the next step in the process.

In the next step the dried substrate material was pressed at a pressure of approximately 400 psi to slightly densify and strengthen the material. The material prepared by the above process exhibited approximately 55% total porosity, had a conductivity in the plane of the substrate of 0.0520 ohm-centimeter and a conductivity through the substrate or perpendicular to the substrate plane of 0.070 ohm-centimeter.

In the porous substrate 75% of the pores had a pore size larger than 0.1 micron and 60% of the pores had a pore size larger than 3.75 microns. This material was used in fuel cells, and the results are shown in Table 2.

TABLE 2

COMPARISON OF TANTALUM SCREEN AND GRAPHITE-PTFE ELECTRODE SUPPORTS IN TERMS OF AIR ELECTRODE PERFORMANCE

| Time (hours) | Current Density (amp/sq.ft.) | Tantalum Screen Voltage Wrt $H_2$ (volts) | | Graphite-PTFE Voltage Wrt $H_2$ (volts) | |
|---|---|---|---|---|---|
| | | Air | Oxygen | Air | Oxygen |
| 50 | 0 | 1.00 | 1.02 | .96 | .99 |
| | 50 | .78 | .86 | .77 | .85 |
| | 100 | .74 | .84 | .73 | .83 |
| 500 | 0 | .93 | .95 | .96 | .98 |
| | 50 | .75 | .84 | .77 | .85 |
| | 100 | .71 | .80 | .72 | .82 |
| 2000 | 0 | .92 | .95 | .95 | .96 |
| | 50 | .74 | .85 | .74 | .85 |
| | 100 | .69 | .81 | .70 | .82 |

EXAMPLE 2

In Example 2 a very similar process was used to prepare an electrode substrate. In this example the electrode was made up of essentially 7.5% by weight of PTFE, 77% particulate carbon as in Example 1, and 15.5% carbon fibers.

Using this formulation it was possible to produce electrodes with total porosities of 70%, a parallel conductivity of 0.05 ohm-centimeter, a perpendicular conductivity of 0.065 ohm-centimeter, pressed at a pressure of 1000 pounds per square inch.

EXAMPLE 3

In this example the materials were processed again by the same method as described in the previous examples, except that the composition of the substrate was altered to 2% PTFE, 70% particulate carbon, 18% fibrous carbon and 10% polyphenylenesulfide (PPS). This material is processed in the same way, but in the final step was subjected to a pressure of 1000 pounds per square inch and a temperature of 600°F. The effect of the temperature was to cause the PPS material to take a set under pressure. The result was an electrode substrate which exhibited the following properties.

It was 60% porous, had a conductivity of 0.07 ohm-centimeter in the plane of the electrode, 0.7 ohm-centimeter perpendicular to the plane of the electrode. The material was more rigid; this can be a desirable feature in certain applications.

We claim:

1. A method for the manufacture of an electrically conductive substrate for use as an electrode support in a fuel cell comprising the steps of:
   a. blending a quantity of carbon with dry powdered polytetrafluoroethylene in a lubricant to form a homogeneous mixture, said polytetrafluoroethylene constituting from 6 percent to no more than 32 percent of the combined weight of said carbon and said polytetrafluoroethylene;
   b. filtering lubricant from said blend to form a filtered mixture;
   c. subjecting said filtered mixture to rolling forces effecting thickness reduction thereof, thereby forming a sheet of fibrillated polytetrafluoroethylene containing carbon and lubricant; and
   d. removing the remainder of said lubricant from said sheet.

2. A method for the manufacture of an electrically conductive substrate for use as an electrode support in a fuel cell comprising the steps of:
   a. blending a quantity of carbon and a quantity of a thermosetting resin with dry powdered polytetrafluoroethylene in a lubricant to form a homogeneous mixture;
   b. filtering lubricant from said blend to form a filtered mixture;
   c. subjecting said filtered mixture to rolling forces effecting thickness reduction thereof, thereby forming a sheet of fibrillated polytetrafluoroethylene containing carbon, thermosetting resin and lubricant;
   d. removing the remainder of said lubricant from said sheet; and then
   e. pressing said sheet while maintaining said sheet at temperatures above the thermosetting temperature of said thermosetting resin and above the sintering temperature of said polytetrafluoroethylene.

3. The electrically conductive substrate produced by practice of the method claimed in claim 2.

* * * * *